United States Patent [19]

Masciarelli

[11] 4,061,900
[45] Dec. 6, 1977

[54] INDICIA VALIDATION SYSTEM

[75] Inventor: Francis John Masciarelli, Milford, Mass.

[73] Assignee: Data General Corporation, Southboro, Mass.

[21] Appl. No.: 677,687

[22] Filed: Apr. 16, 1976

[51] Int. Cl.² ..................... G06K 7/10; G08C 9/06
[52] U.S. Cl. .............................. 235/437; 250/555; 235/463
[58] Field of Search ........................ 235/61.11 E; 340/146.3 F; 250/555

[56] References Cited

U.S. PATENT DOCUMENTS

| 3,864,548 | 2/1975 | O'Neil, Jr. et al. | 235/61.11 E |
| 3,882,464 | 5/1975 | Zamkow | 235/61.11 E |
| 3,906,203 | 9/1975 | Butulis | 235/61.11 E |
| 3,916,154 | 10/1975 | Hare et al. | 235/61.11 E |
| 3,978,319 | 8/1976 | Vinal | 235/61.11 E |

Primary Examiner—Daryl W. Cook
Attorney, Agent, or Firm—Donald Brown

[57] ABSTRACT

System and method for validating UPC (Universal Product Code) or TRI-BAR indicia on packaging or the like and which includes means for finding the start and end codes of the indicia, means for checking the tolerances of the black-white band pairs of the indicia, etc., in order to control the storage and use of information obtained from the indicia.

10 Claims, 3 Drawing Figures

INDICIA VALIDATION SYSTEM

BACKGROUND OF THE DISCLOSURE

This invention relates to a system for validating UPC (Universal Product Code) or TRI-BAR coded indicia used on packaging or the like to identify products and provide information concerning said products.

It is well known that systems have been developed to scan the above mentioned indicia and such systems have found acceptance in the supermarket industry.

Such UPC indicia is currently scanned by a device at the check-out stations in a supermarket or the like and the information detected from the indicia is fed to a computer which then generates the price to be charged to the customer for each item.

In addition to UPC indicia detection systems, a TRI-BAR indicia scanning system has also been developed (see U.S. Pat. No. 3,891,831). TRI-BAR coded indicia as shown in U.S. Pat. No. 3,891,831 is primarily intended for use where the indicia is applied by the retailer rather than the manufacturer of the goods since UPC codes are somewhat difficult to apply to goods.

Inasmuch as those supermarkets which utilize TRI-BAR indicia on some packaging will also be utilizing UPC indicia on other packaging, any checkout reading and decoding system must be capable of accurately detecting both types of indicia and validating that either one or the other type of indicia has been detected.

In particular, for the proper control of data into the computer from the respective indicia, a validator system was needed to locate the start code of either the UPC or TRI-BAR indicia, check the tolerances of the black-white band pairs of the indicia with respect to the type of start code detected, check the end stop codes as appropriate to the type of start code detected and also signal a storage system to store the data representing the indicia being read in the event it is determined that the data is valid. The present validator system provides such a system for accomplishing the aforementioned functions.

DESCRIPTION OF THE PREFERRED EMBODIMENT

Figure 1:
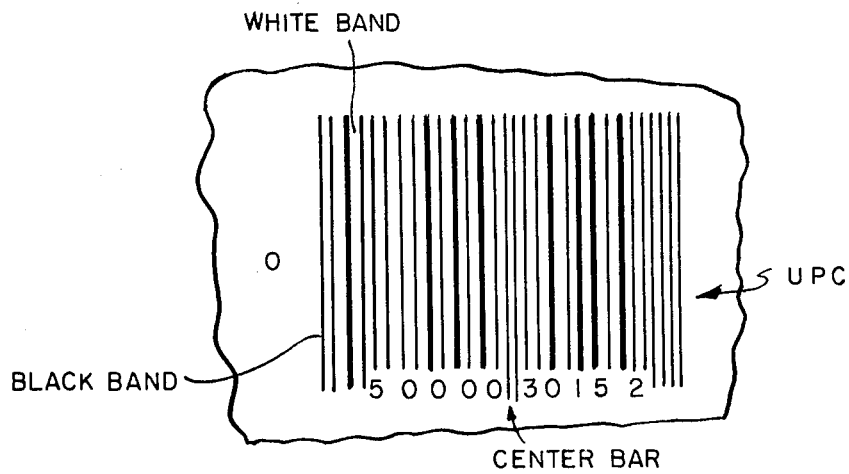
FIG. 1 illustrates a typical UPC coded label.
Figure 2:
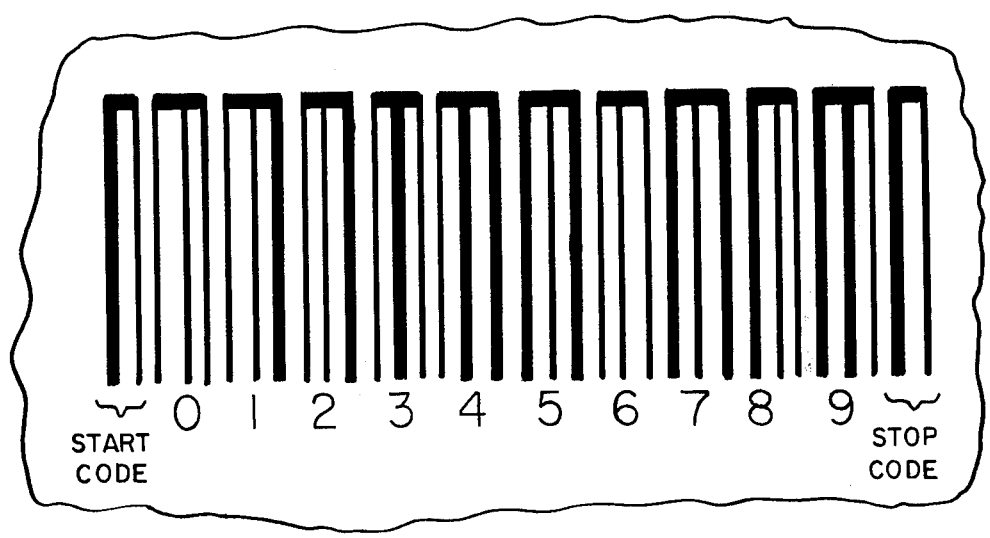
FIG. 2 illustrates the front of type of a TRI-BAR code for applying to a label.
Figure 3:
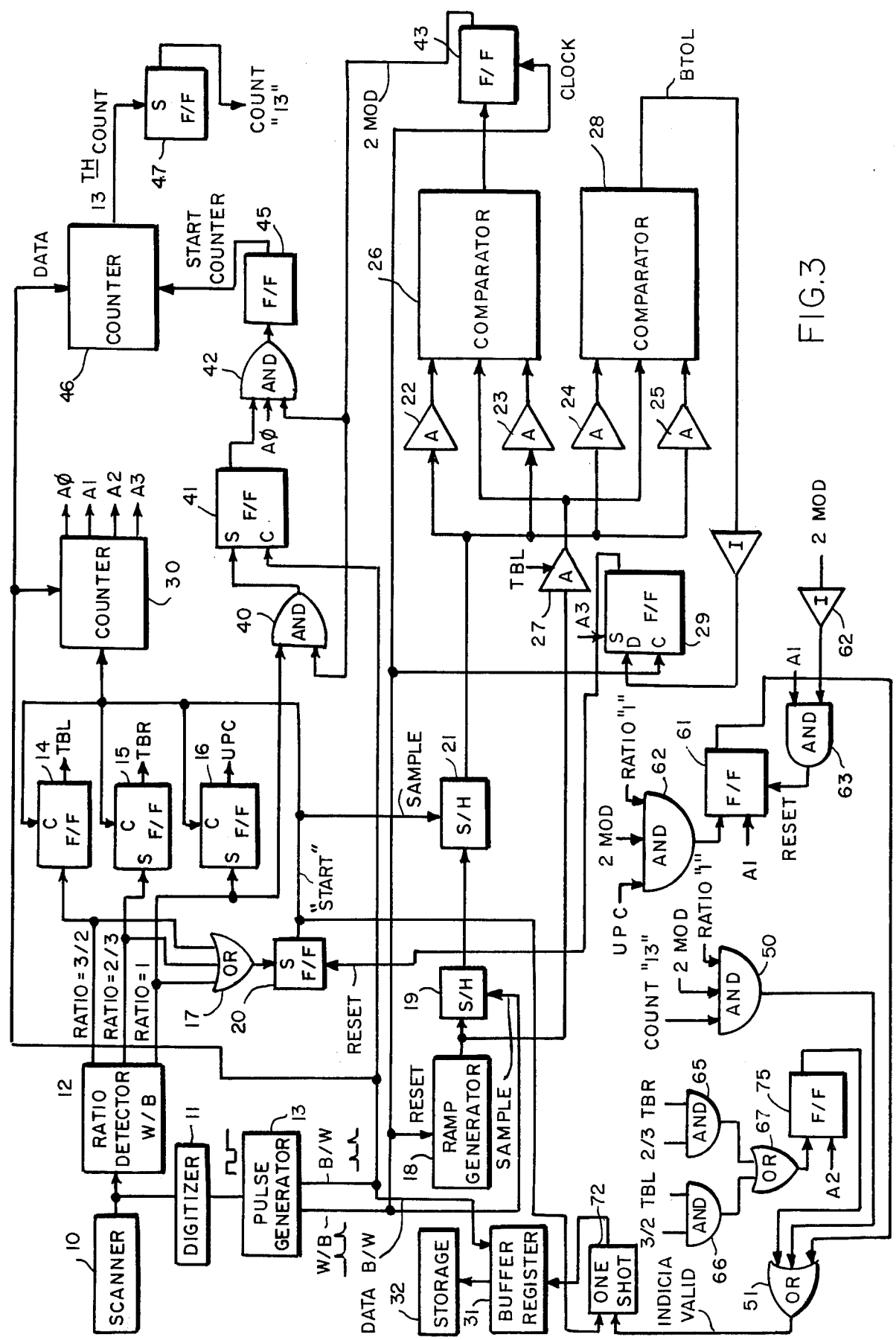
FIG. 3 is a block diagram illustrating the preferred embodiment of the invention.

The scanner 10 (FIG. 3) provides video information related to the number of black and white bars of the indicia (UPC or TRI-BAR) (see FIGS. 1 and 2) on the packaging for the goods e.g., a grocery product. Suitable scanners are shown in U.S. Pat. No. 3,891,831 and commonly assigned U.S. patent application Ser. No. 581,151 filed May 27, 1975.

The video information is provided to a ratio generator e.g., of the type shown in FIG. 4 of U.S. Pat. No. 3,891,831 to generate output signals equal to ratios 3/2, 2/3 and 1 which represent the ratio of black-white band pairs to white-black band pairs of the start code. See the aforementioned patent for an explanation of how this is accomplished. Since the generation of said ratio signals is in the prior art no further explanation will be provided.

If TRI-BAR indicia is present and it is scanned from left to right then the ratio of black-white band pair to white-black band pair is equal to 3/2. If a TRI-BAR indicia is present and it is scanned from right to left then the ratio of black-white band pair and white-black band pair equals 2/3. A band pair is defined in the art as one black bar (B) plus one white bar (blank) (W) no matter the width of each bar. If UPC indicia is present than the ratio of band pairs is equal to 1.

The presence of a signal indicating any of the ratios is present sets data type flip/flops (F/F) 14, 15 or 16 when start F/F 20 is set in order to establish the type of tests to be made in validating the indicia. Only one of the F/F 14, 15, or 16 are set to a one "1" at any time.

If TBL is set to a "one" this indicates that TRI-BAR indicia has been scanned from the left to the right and TRI-BAR is present. If TBR is set to a "one" this indicates that TRI-BAR indicia has been scanned from the right to the left and TRI-BAR is present. UPC indicates that UPC indicia has been detected no matter which direction it has been scanned.

Start F/F 20 is set through "OR" gate 17 by any of the ratio signals going high. The video signal from the scanner is also fed into a conventional digitizer 11 (level comparator) which provides substantially digitized rectangular wave pulses, a logical "1" (+5V) when the input to it is above a certain level and logical "0" (OV) when the input to it is below a predetermined level.

The digitized signal is then fed into a differentiator or pulse generator 13 (see U.S. Pat. No. 3,891,831) which provided W/B and B/W transition signals. The W/B transition signals are fed to reset a conventional triangular ramp generator 18 (e.g., using National Semiconductor (NS) 318 according to NS application notes) to generate a voltage representative of the time between W/B transitions. The signal from generator 18 is sampled at the peak of the ramp and held by a conventional sample and hold circuit 19.

The signal from 19 is then sampled at the time "start" F/F 20 is set by sample and hold circuit 21 and held throughout the presence of indicia (UPC or TRI-BAR).

The output from sample and hold circuit 21 is then used to generate a window to check all subsequent black-white band pairs. One check is to determine if the band pair width is equal to approximately 2 modules since each UPC black-white band pair is supposed to ideally equal two modules (in time).

In order to accomplish the foregoing the output from sample and hold 21 is fed to amplifiers 22 and 23 which are set at gains 2.8 and 1.5 respectively in order to establish a window representing a time tolerance permissible about a band pair. If the signal from the ramp generator 18 after passing through amplifier 27 is within tolerance the output from comparator 26 is high. If it is out of tolerance the output goes low.

F/F 43 coupled to comparator 26 is clocked on W/B transistions and is set if the comparator output is true i.e., high. The device for accomplishing the comparison is a dual voltage comparator 26 such as National Semiconductor LM 711 connected as shown in the text LINEAR INTEGRATED CIRCUITS by National Semiconductor Corporation © 1973, Chap. 3, page 39.

The signals compared after "start" represent (data) of the UPC or TRI-BAR indicia and are provided from the output of generator 18. The signal from generator 18 is fed into a variable gain amplifier 27 which is set for a gain of 2 when input control signal TBL is low. The signal from amplifier 27 is then fed into comparator comparator 26 and compared to see if it is within the window limits.

The "start" signal also sets a counter 30. One output A0 of counter 30 starts out high and goes low at the 14th B/W transition. Another output A1 which goes high only on the 14th B/W transition and returns to low before the 15th B/W transition. Output A2 is also provided which goes high on the 20th B/W transition and goes low before the 21st B/W transition.

A further output is provided which goes high on 29th B/W to clear "start" F/F 20. The "start" signal is also fed to a data buffer to indicate the position of "start" of presumably valid data. Data from the indicia is at all times being fed into a conventional buffer register 32.

Amplifier 27 changes gain from 2 to 3 if TBL is high since if TRI-BAR is scanned left, the "start" signal is 3 mods of if one starts scanning within UPC a "start" signal could be 3 mods and thus produce a TBL which will allow checking of band pairs for the rest of the label. The amplifier 27 may be constructed to change its gain by changing the amount of feedback resistance and may be conveniently accomplished by those skilled in the art using a parellel network of resistance in the feedback loop of a conventional operational amplifier with a controlled FET switch in one of the resistance paths controlled by TBL.

The input signal from sample and hold circuit 21 is also fed into amplifiers 24 and 25 which are preset at gains 9.2 and 1.5 respectively to determine if each ban width pair is within the established tolerance. The test is made to determine if the sequentially detected band pairs are spaced to far apart or to close in time from one another. If so, this is an indication that the data being detected could not be part of indicia that was indicated as being present by the initial "start" signal.

The comparator 28 for accomplishing same is the same type as comparator 26 and provides a low output signal (identified as BTOL) only when the check indicates the band pairs are out of tolerance. Otherwise, the output signal from comparator 28 is high indicating that no out of tolerance signals have been detected.

If the BTOL signal does appear a F/F 29 which is clocked by W/B transition signals is set and resets "start" F/F 20.

If a 2 Mod signal is present from F/F 43 when the output ratio = 1 signal is also present, the next B/W transition sets F/F 41 and if on the next W/B transition another 2 Mod signal appears, F/F 45 is set and start counter 46. Counter 46 counts B/W transitions and on the thirteenth count sets F/F 47. The above indicates that a two module B/W with ratio = 1 followed by a single white bar has been detected.

The setting of F/F 47 is one of the conditions necessary for one type of indicia valid signal to be provided if the indicia is UPC because there must be at least thirteen transitions after the five center guard bars (W,B,W,B,W) of the UPC indicia if the data is to be valid and represents the last half of UPC indicia.

The output from "AND" gate 50 indicates that ½ of UPC indicia is correct and should be stored and is derived if signals count "13", 2 Mod and ratio "1" are present.

In the event that no BTOL signal is provided to clear "start" F/F 20, on the 14th B/W transition (signal A1) and in the presence of a 2 Mod and ratio = 1 signals appearing, a F/F 61 is set and stays set if the next band pair causes a 2 Mod signal to be provided. This indicates that the data is valid, i.e., the first half of UPC has been encountered. On the other hand, if no 2 Mod signal appears on the next W/B transition, then F/F 61 is reset indicating no valid data.

F/F 61 is reset by the 2 Mod signal being inverted by inverter 62 which is "ANDED" with signal A1 in "AND" gate 63 which is still present because the counter 30 continues to provide such signal.

Thus the indicia valid signal from F/F 61 is fed to "OR" gate 51. If at this time no valid indicia signal has appeared on the 20th B/W transition (represented by output A2 from counter 30), F/F 75 is set by either of signals generated via "AND" gate 65 and 66 which respectively check ratio ⅔ and TBR and ratio 3/2 and TBL through "OR" gate 67.

F/F being set at A2 time indicates that valid TRI-BAR data is present. On the 29th B/W transition (A3 signal from counter 30) sets F/F 29 and thus causes F/F 20 to be cleared.

When "start" F/F 20 is cleared, the indicia valid signal is checked. If the indicia valid signal is true (High) one shot 72 gives an indicia valid pulse to cause the temporary storage 31 (buffer register) to dump data into a computer storage element 32 e.g., core memory. Counters 30, 46 and F/F 47, 61 and 75 are reset when "start" from F/F 20 goes low.

It should be understood that ratio detector 12 is continuously looking for the required ratios and will restart the sequence upon detection of a required ratio.

I claim:

1. A system for validating data derived from UPC encoded indicia comprising
   a. first means for providing a first signal indicating a count of 13 B/W transitions after the UPC guard bars are detected from said indicia;
   b. second means for providing a second signal indicating if a band pair ratio equal to 1 is present in said indicia;
   c. third means for generating a band pair tolerance signal from said indicia if said indicia is proper and
   fourth means responsive to said first, second and band pair tolerance signal for generating an indicia valid signal if all said signals are present.

2. The system according to claim 1 in which the band pair tolerance signal represents an indication that the black - white band pair width is within a preselected tolerance.

3. A system for validating data derived from UPC encoded indicia comprising
   a. first means for providing a first signal indicating if a band pair ratio equal to 1 is present in said UPC indicia;
   b. second means for providing a second signal indicating if each B/W band pair width within a preselected tolerance is present in said UPC indicia;
   c. third means for providing a third signal indicating if on the 14th B/W transition in said detected UPC indicia a ratio equal to 1 is present; and
   d. fourth means responsive to said first, second and third signals for generating an indicia valid signal if all said signals are present.

4. A system for validating data derived from TRI-BAR encoded indicia comprising
   a. first means for generating a first signal from said indicia indicating if the band pair ratio of the indicia as scanned is equal to 3/2;
   b. second means responsive to said first signal for generating a second signal indicating if the indicia has been scanned from left to right;

c. third means for generating a third signal from said indicia indicating if the band pair ratio of the indicia as scanned is equal to 2/3;
d. fourth means responsive to said third signal for generating a fourth signal indicating if the indicia has been scanned from right to left;
e. fifth means for generating a fifth signal representing the 20th B/W transition derived from the indicia after the start code of the indicia has been detected and
f. sixth means for generating an indicia valid signal if either said first, second and fifth signals are present or if said third, fourth and fifth signals are present.

5. In a system for providing data represented by indicia coded in either UPC or TRI-BAR which comprises temporary storage means for temporarily storing data represented by said indicia, and indicia validating means coupled to said temporary storage means for providing a valid indicia signal to cause said temporary storage to provide said data to a computer for operating on same, said validating means comprising first means for checking said UPC indicia to determine if it falls without predetermined limits at two different times and second means for checking said TRI-BAR indicia to determine if it falls without predetermined limits at one time.

6. In the system of claim 5 wherein said validating means includes means for sampling said data to determine if all data should be rejected based on the time between detected band pairs.

7. In a system for providing validated data representative of UPC label indicia to a computer storage means, said system comprising means for detecting the "start" code of said indicia to provide a first control signal means for checking the data to determine if it meets a predetermined band pair tolerance and providing a second control signal representative of same, means for establishing if the sequence between band pairs is greater or less than a predetermined time interval to determine if at least half a UPC label indicia is present to provide a third control signal representative of same and means responsive to said first, second and third control signals for causing valid data to be provided to said computer storage means.

8. In the system of claim 7 in which means are provided for generating a fourth control signal representative of the number of B/W transitions after detection of a "start" code, said fourth control signal also controlling the providing of valid data to said computer storage means.

9. In the system of claim 8 in which means are provided for generating a fifth control signal representative of a second number of detected B/W transitions, said fifth control signal also controlling the providing of valid data to said computer storage means.

10. In the system of claim 8 including means for generating a UPC signal indicative of said code to control the application of valid data to said computer storage means.

* * * * *